US008177241B1

(12) United States Patent
Marks et al.

(10) Patent No.: US 8,177,241 B1
(45) Date of Patent: *May 15, 2012

(54) VEHICLE FOR USE ON THE SNOW OR OTHER SURFACE

(76) Inventors: Lynn Sue Marks, Arlington, WA (US); Bentley Wayne Surdyk, Arlington, WA (US)

( * ) Notice: Subject to any disclaimer, the term of this patent is extended or adjusted under 35 U.S.C. 154(b) by 512 days.

This patent is subject to a terminal disclaimer.

(21) Appl. No.: 12/381,912

(22) Filed: Mar. 18, 2009

Related U.S. Application Data

(60) Provisional application No. 61/070,175, filed on Mar. 21, 2008.

(51) Int. Cl.
*B62B 13/00* (2006.01)
(52) U.S. Cl. ............ 280/14.28; 280/16; 280/21.1
(58) Field of Classification Search ........... 280/87.1, 280/87.021, 87.041, 47.34, 281.1, 21.1, 22.1, 280/14.1, 14.21, 14.27, 14.28, 17, 603, 606, 280/607, 11.15, 11.18
See application file for complete search history.

(56) References Cited

U.S. PATENT DOCUMENTS

| | | | | |
|---|---|---|---|---|
| 577,306 A * | 2/1897 | Kolbenson | ............... | 280/7.14 |
| 2,513,199 A * | 6/1950 | Ohlhaver | ............... | 280/14.28 |
| D215,950 S * | 11/1969 | Porsche | ............... | D12/10 |
| 3,561,783 A * | 2/1971 | Ellett | ............... | 280/16 |
| D223,267 S * | 4/1972 | Wooster | ............... | D12/10 |
| D224,125 S * | 7/1972 | Boganowski | ............... | D12/8 |
| 3,785,448 A * | 1/1974 | Merenheimo et al. | ...... | 280/21.1 |
| 3,893,527 A * | 7/1975 | Walker et al. | ............... | 180/183 |
| 4,101,142 A * | 7/1978 | Turner | ............... | 280/16 |
| 4,116,455 A * | 9/1978 | Dotson et al. | ............... | 280/7.12 |
| 4,138,128 A * | 2/1979 | Criss | ............... | 280/16 |
| 4,161,324 A * | 7/1979 | Colvin | ............... | 280/14.25 |
| 4,274,647 A * | 6/1981 | Drake, Jr. | ............... | 280/87.042 |
| 4,725,069 A * | 2/1988 | Stampacchia et al. | ...... | 280/607 |
| 4,768,794 A * | 9/1988 | Bibollet | ............... | 280/21.1 |
| 4,775,162 A * | 10/1988 | Chao | ............... | 280/87.041 |
| 4,869,336 A * | 9/1989 | Nakasaki et al. | ............ | 180/196 |
| 5,351,975 A * | 10/1994 | Petoud | ............... | 280/14.28 |
| D384,912 S * | 10/1997 | Lanner | ............... | D12/7 |
| D460,137 S * | 7/2002 | Burger | ............... | D21/767 |
| D460,720 S * | 7/2002 | Aguilar | ............... | D12/8 |
| D466,833 S * | 12/2002 | Pan | ............... | D12/8 |
| D467,199 S * | 12/2002 | McClure et al. | ............... | D12/8 |
| 6,554,294 B2 * | 4/2003 | Laudon | ............... | 280/7.14 |
| 6,575,479 B2 * | 6/2003 | Combs | ............... | 280/21.1 |
| 6,736,414 B2 * | 5/2004 | Farrally-Plourde | ............ | 280/16 |
| 6,783,134 B2 * | 8/2004 | Geary | ............... | 280/21.1 |
| 6,805,364 B2 * | 10/2004 | McClure et al. | ............ | 280/14.28 |
| 6,994,359 B1 * | 2/2006 | Silver | ............... | 280/16 |
| 6,997,465 B2 * | 2/2006 | Jungnickel | ............... | 280/14.27 |
| 7,104,551 B2 * | 9/2006 | Takahashi | ............... | 280/14.25 |
| D585,332 S * | 1/2009 | Marks et al. | ............... | D12/10 |
| 7,537,221 B2 * | 5/2009 | Lasala | ............... | 280/16 |

(Continued)

*Primary Examiner* — J. Allen Shriver, II
*Assistant Examiner* — Brodie Follman
(74) *Attorney, Agent, or Firm* — Ted Masters (57) ABSTRACT

A vehicle for use on the snow or other surfaces includes a frame and a fork assembly pivotally connected to the frame. The fork assembly is pivotally connected to a front board, and the frame is connected to a rear board. An inverted and reversed skateboard truck is used to connect the fork assembly to the front board. A biasing member urges the front board into a nose up angle. The frame is connected to the rear board by a U-shaped stay mount, and a shock absorber is connected between the frame and the stay mount. The combined front and rear boards have the shape of a snowboard.

6 Claims, 9 Drawing Sheets

U.S. PATENT DOCUMENTS

| | | | |
|---|---|---|---|
| 7,547,023 B2* | 6/2009 | Yau | 280/16 |
| 7,726,667 B2* | 6/2010 | Ferron | 280/16 |
| 7,762,564 B2* | 7/2010 | Stene-Johansen et al. | 280/16 |
| 2002/0121754 A1* | 9/2002 | Nall, III | 280/87.021 |
| 2002/0125670 A1* | 9/2002 | Stratton | 280/87.041 |
| 2003/0006569 A1* | 1/2003 | Combs | 280/21.1 |
| 2003/0222419 A1* | 12/2003 | Geary | 280/21.1 |
| 2004/0017052 A1* | 1/2004 | Takahashi | 280/14.28 |
| 2004/0075227 A1* | 4/2004 | Jungnickel | 280/14.21 |
| 2004/0100044 A1* | 5/2004 | Monike et al. | 280/14.1 |
| 2007/0267827 A1* | 11/2007 | Lasala | 280/14.28 |
| 2008/0258414 A1* | 10/2008 | Ferron | 280/16 |
| 2009/0140503 A1* | 6/2009 | Kolesar et al. | 280/16 |
| 2009/0230641 A1* | 9/2009 | Eugenio | 280/16 |

\* cited by examiner

VEHICLE FOR USE ON THE SNOW OR OTHER SURFACE

CROSS REFERENCE TO RELATED APPLICATION

This application claims the filing benefit under 35 U.S.C. §119(e) of U.S. Provisional Application No. 61/070,175, filed Mar. 21, 2008, which is herein incorporated by reference.

TECHNICAL FIELD

The present invention pertains generally to vehicles, and more particularly to a vehicle which slides on two ski-like boards, and which may be used on snow or other surface.

BACKGROUND OF THE INVENTION

Vehicles which have ski-like boards rather than wheels are know in the art. These vehicles are typically used for transportation and recreation on the snow. For example U.S. Pat. Nos. 4,244,436 and 4,286,682 illustrate motorized versions of such vehicles in which the rider assumes a seated position. Similarly, conventional scooters are well known, and usually comprise a upwardly extending steering column/handle and a wheeled platform upon which the rider stands.

BRIEF SUMMARY OF THE INVENTION

The present invention is directed to a vehicle for use on the snow, but which also can be used on grass, sand, dirt, and similar surfaces. The vehicle is shaped similar to a conventional scooter, but rather than riding on wheels, the vehicle slides on two independent ski-like boards. A rider stands upon the deck of the vehicle as with a conventional wheeled scooter, and can steer by turning handlebars and/or shifting his/her weight. The vehicle's front and rear boards are constructed in the fashion of a snowboard.

In accordance with a preferred embodiment of the invention, a vehicle for use on the snow or other surfaces includes a frame which is pivotally connected to a fork assembly. A front board having a top surface and an opposite bottom surface is pivotally connected to the fork assembly by a skateboard truck which is mounted in an upside down and backward position on the top surface of the front board. The frame is connected to the top surface of a rear board.

In accordance with an aspect of the invention, the front board has a nose, and the said skateboard truck has a kingpin and a pivot cup. The kingpin is disposed between said nose of the front board and the pivot cup.

In accordance with another aspect of the invention, a biasing member engages the fork assembly and the front board, and urges the front board into a nose up angle.

In accordance with another aspect of the invention, the nose up angle is between about 5° and about 10°.

In accordance with another aspect of the invention, the biasing member is a torsion spring.

In accordance with another aspect of the invention, the frame has an upwardly angled upper portion and a horizontal lower portion. A U-shaped stay mount is connected to the top surface of the rear board. The horizontal lower portion of the frame is pivotally connected to the stay mount. A shock absorber is connected between the stay mount and the upwardly angled upper portion of the frame.

In accordance with another aspect of the invention, when the front board and the rear board are longitudinally aligned, in plan view (1) the first board, (2) the rear board, and (3) imaginary side lines connecting the front board and the rear board, all combine to substantially form an outline of a snowboard.

Other features and advantages of the present invention will become apparent from the following detailed description, taken in conjunction with the accompanying drawings, which illustrate, by way of example, the principles of the invention.

DETAILED DESCRIPTION OF THE INVENTION

Referring initially to FIGS. 1-6, there are illustrated front perspective, top plan, side elevation, bottom plan, front elevation, and opposite rear perspective views respectively of a vehicle for use on the snow or other surface in accordance with the present invention, generally designated as 20. Vehicle 20 includes an angled frame 24 connected at the top to two angled side members 26. A fork assembly 28 including steering handlebar 29 is pivotally connected to frame 24 in a manner similar to a bicycle. Vehicle 20 further includes a front board 30 having a top surface 32 and an opposite bottom surface 34. A skateboard truck 36 is connected to top surface 32 of front board 30, and the two fork members of fork assembly 28 are pivotally connected to skateboard truck 36. A rear board 38 having a top surface 40 and an opposite bottom surface 42 is connected to frame 24. A deck 44 (platform) upon which a rider stands is connected to frame 24 and two angled side members 26. In an embodiment of the invention, a binding for receiving the foot of the rider (similar to a ski binding) is fixedly attached to deck 44 (refer to FIG. 10). It is noted that as used herein, the terms top and bottom are referenced to the shown normal upright in-use position of vehicle 20.

Figure 1:
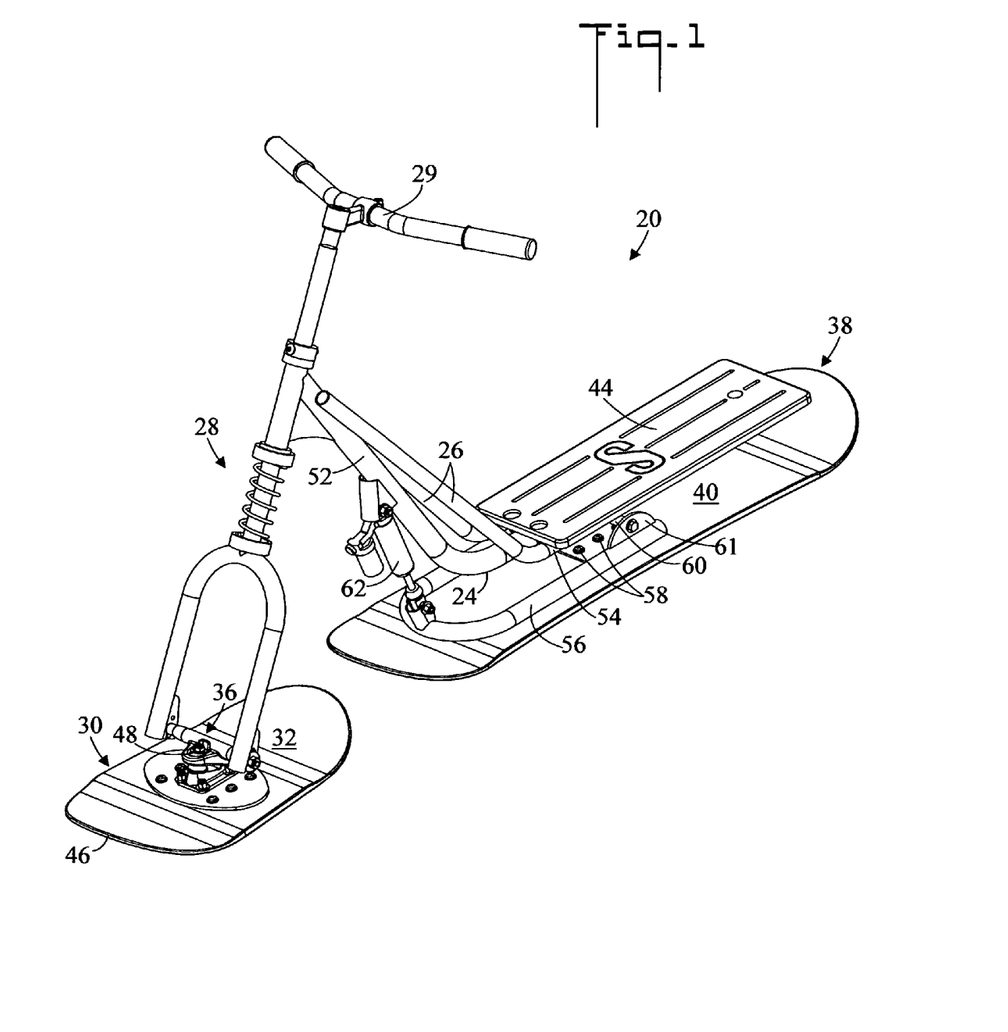
FIG. 1 is a front perspective view of a vehicle for use on the snow or other surface in accordance with the present invention.
Figure 2:
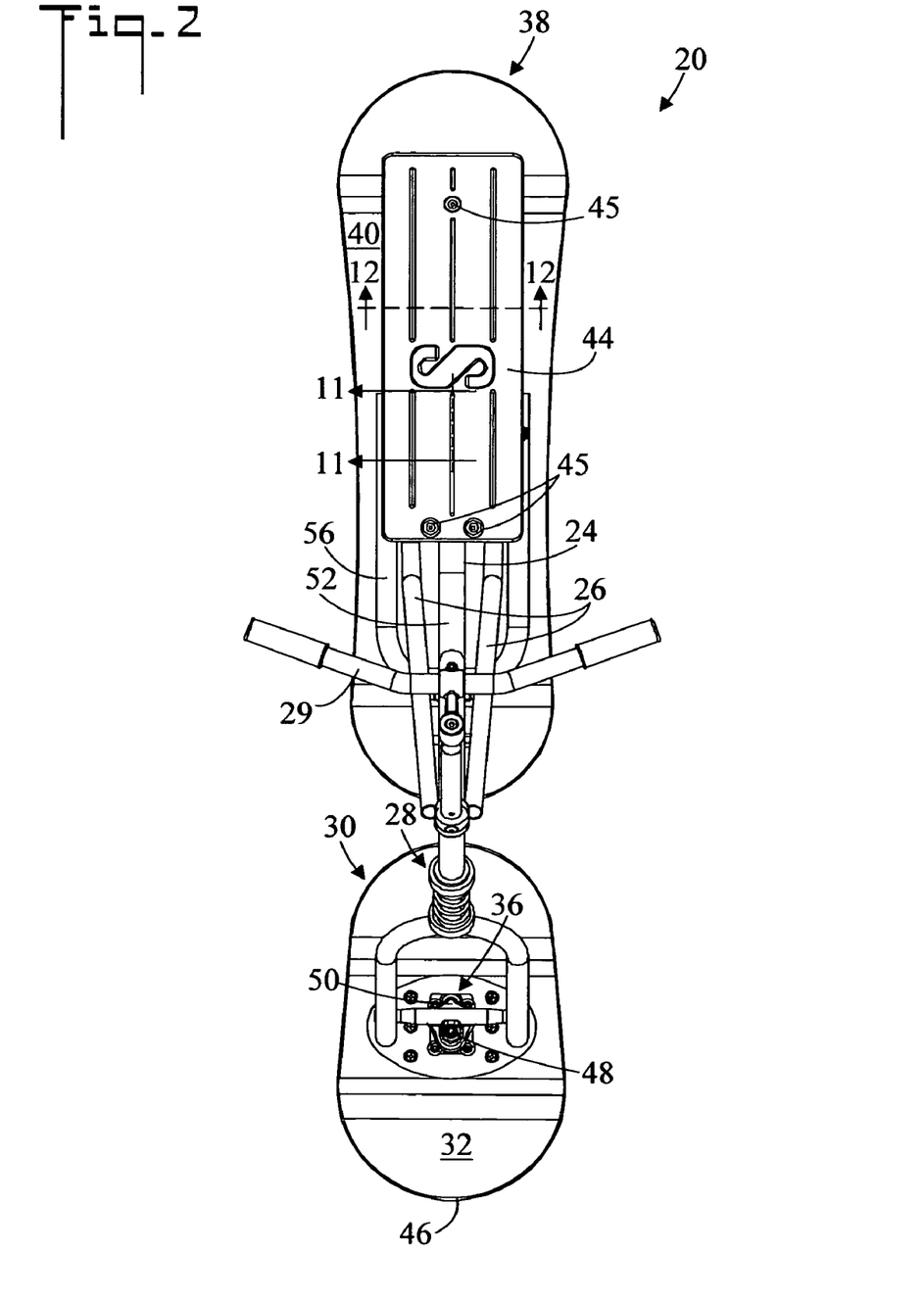
FIG. 2 is a top plan view of the vehicle.
Figure 3:
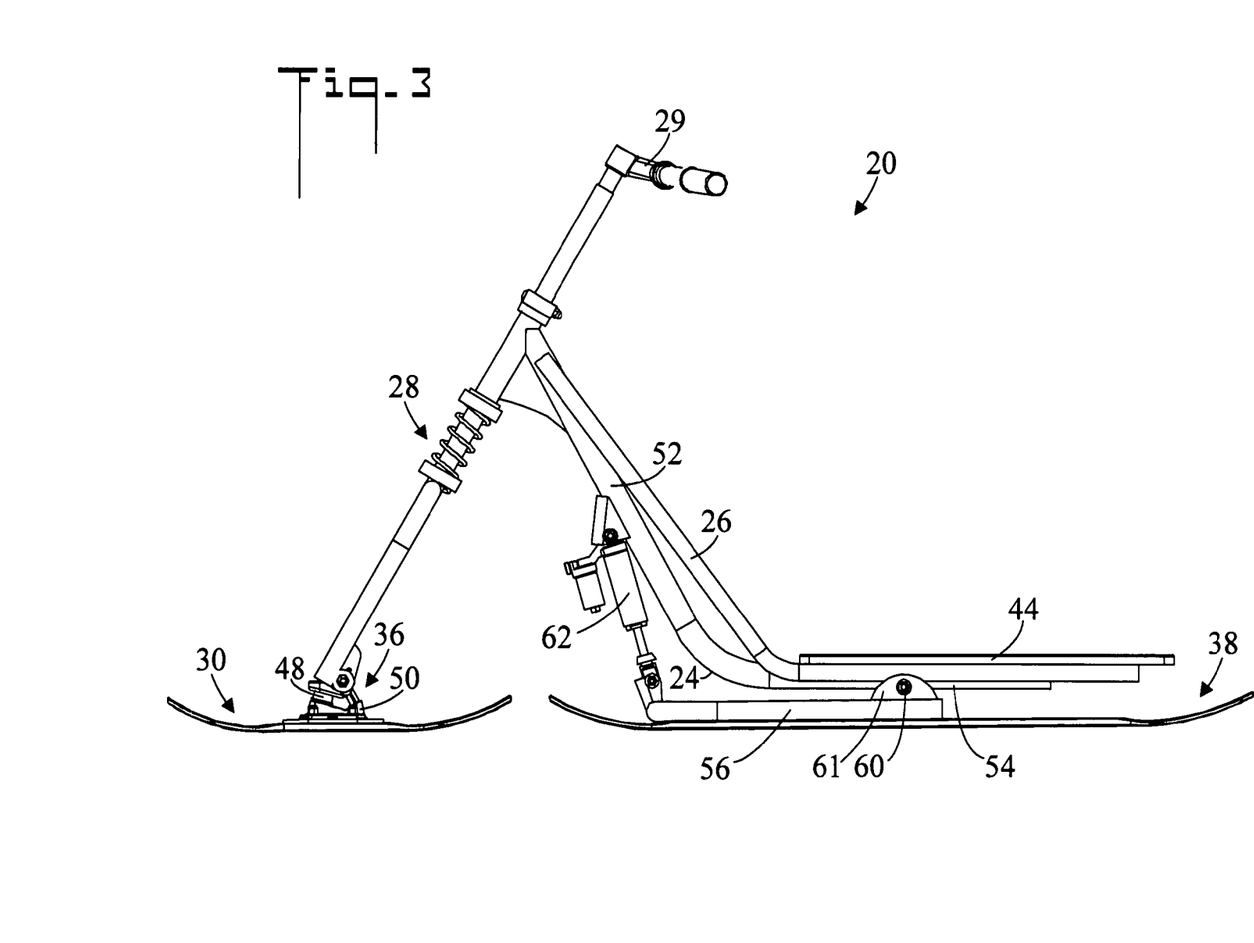
FIG. 3 is a side elevation view of the vehicle.
Figures 7, 8, 9:
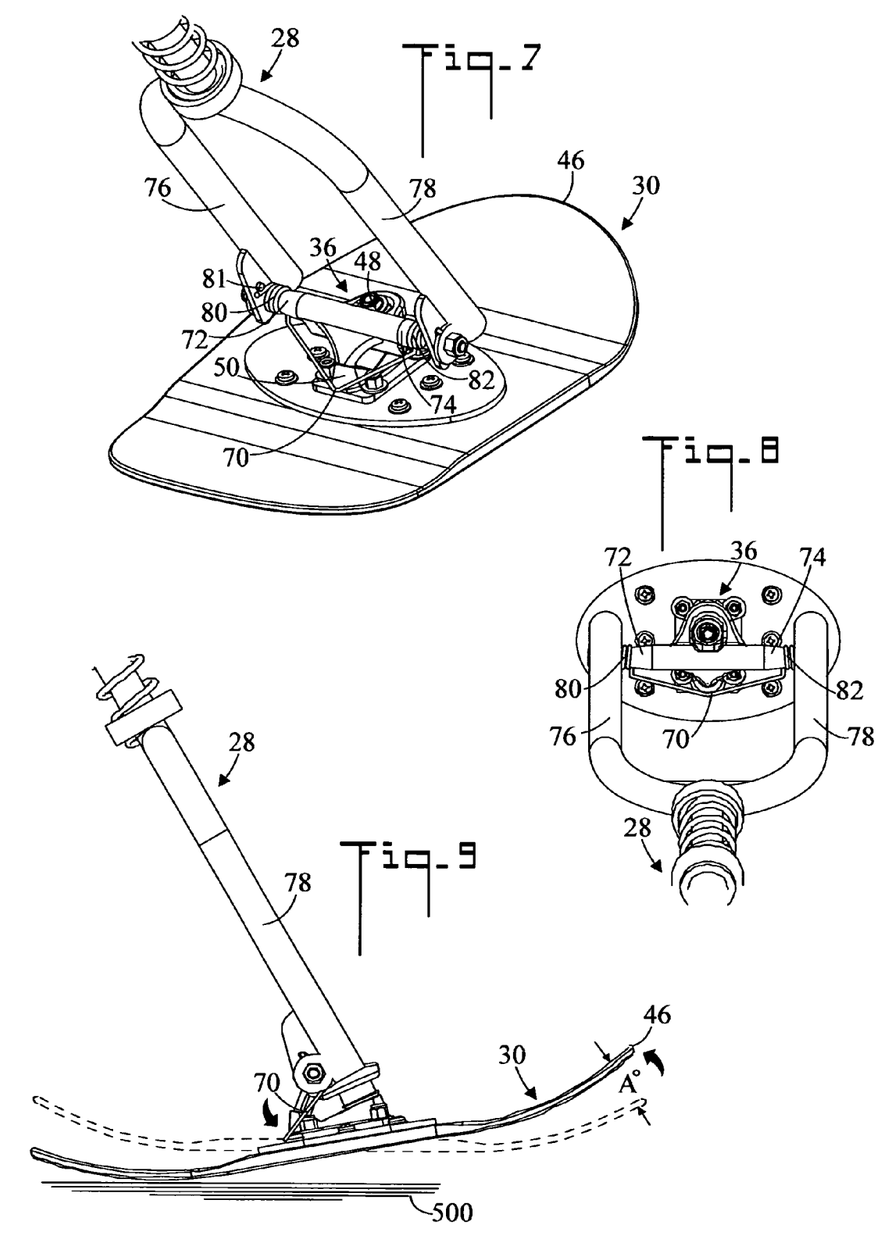
FIG. 7 is an enlarged opposite rear perspective view of a front board showing a biasing member.
FIG. 8 is an enlarged top plan view showing the biasing member.
FIG. 9 is an enlarged side elevation view of the front board showing the biasing member; and, FIG. 10 is a side elevation view of a binding attached to the deck of the vehicle.

Front board 30 has a nose 46, and skateboard truck 36 has a kingpin 48 and a pivot cup 50 (best shown in FIG. 2 and FIG. 7). In the present invention, kingpin 48 is disposed between nose 46 and pivot cup 50. It is noted that this arrangement is the reverse of the conventional mounting of skateboard trucks wherein the pivot cup, not the kingpin, faces the end of the skateboard. As such the present invention employs the skateboard truck in a novel upside down and reversed configuration. That is, in a skateboard the trucks are mounted on the bottom of the skateboard near each end of the skateboard, and includes a pair of wheels at each end of its axles. Conversely in the present invention the single truck 36 is mounted to the top of front board 30 in an inverted position, and is further reversed such that kingpin 48 is forward of the truck's axle and the pivot cup 50 aft of the axle. In this position, when the rider shifts weight laterally across vehicle 20, the fork attached to the truck's axle twists, causing vehicle 20 to turn in the direction of the weight shift. Truck 36 also serves, by means of a suspension system (e.g., urethane bushings), to resiliently resist the rider's lateral tilt of vehicle 20, thus stabilizing front board 30 and returning it to its normal position straight ahead when the turn is completed. This lateral stability is crucial for high speed, distance riding and aerial tricks where a firm platform is desired. Truck 36 also has an adjustment for the kingpin 48 to allow the rider the ability increase stiffness for lateral stability, when tightened sufficiently. Conversely, loosening truck 36 makes turning easier, but can cause wobbling, especially at higher speeds. Various skateboard trucks having different movement properties can be used in the present invention to best serve the needs of the rider.

Angled frame 24 has an upwardly angled upper portion 52 (leg) and a horizontal (when vehicle 20 resides on a flat horizontal surface) lower portion 54 (other leg). A U-shaped stay mount 56 is connected to top surface 40 of rear board 30 by screws 58. Horizontal lower portion 54 of frame 24 is pivotally connected to stay mount 56 by pivot axle 60. The pivotal connection is effected by (1) flange 61 which is fixedly connected to stay mount 56 and which pivotally receives pivot axle 60, and (2) the connection of lower portion 54 to pivot axle 60 (refer also to FIG. 11 and the associated discussion). A shock absorber 62 is connected between stay mount 56 and upwardly angled upper portion 52 of frame 24. Rear board 38 attaches to U-shaped stay mount 56. U-shaped stay mount 56 attaches to lower portion 54 of frame 24 by axle supports which carry pivot axle 60 enclosed in a axle housing attached to the under side of lower portion 54. Gas or oil shock absorber 62 attaches to the front of U-shaped stay mount 56. The precharge in the shock absorber 62 is adequate and adjustable in both extend and retract position to provide positive pressure to the full extend stroke allowing rear board 38 to be in contact with the riding surface in adverse terrain. Shock absorber 62 is interchangeable from a gas or oil to meet the demands of the rider. Shock absorber 62 provides positive pressure to the tip of rear board 38 at all times by continually adjusting up and down in the vertical axes in relationship to the riding surface. This results in giving rear board 38 a longer effective edge at high speeds and a shorter effective edge at low speeds. This enhances the performance in curved turns, and reduces vibration, chatter, skipping, slipping, and skidding.

Figure 4:
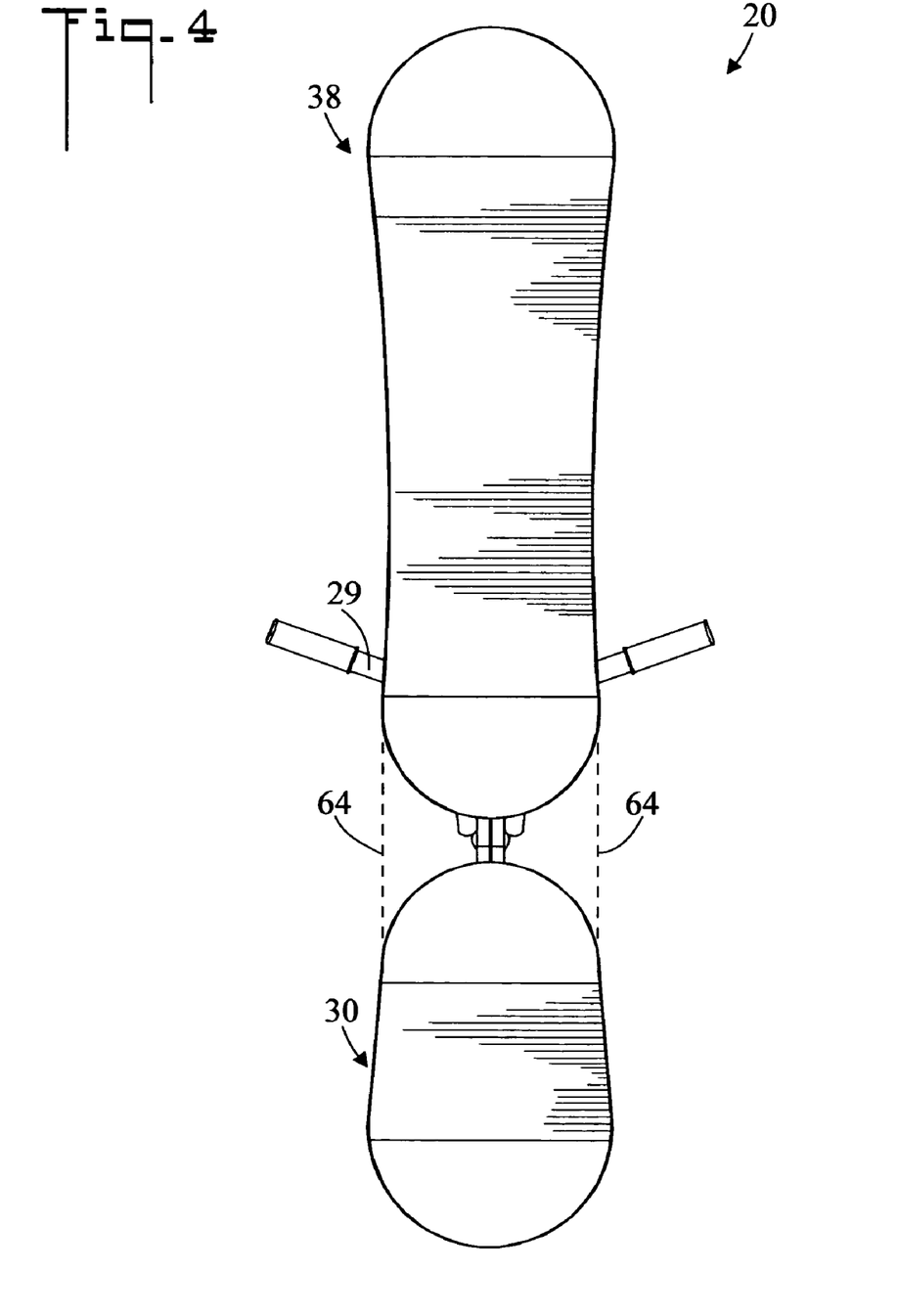
FIG. 4 is a bottom plan view of the vehicle.
Figure 5:
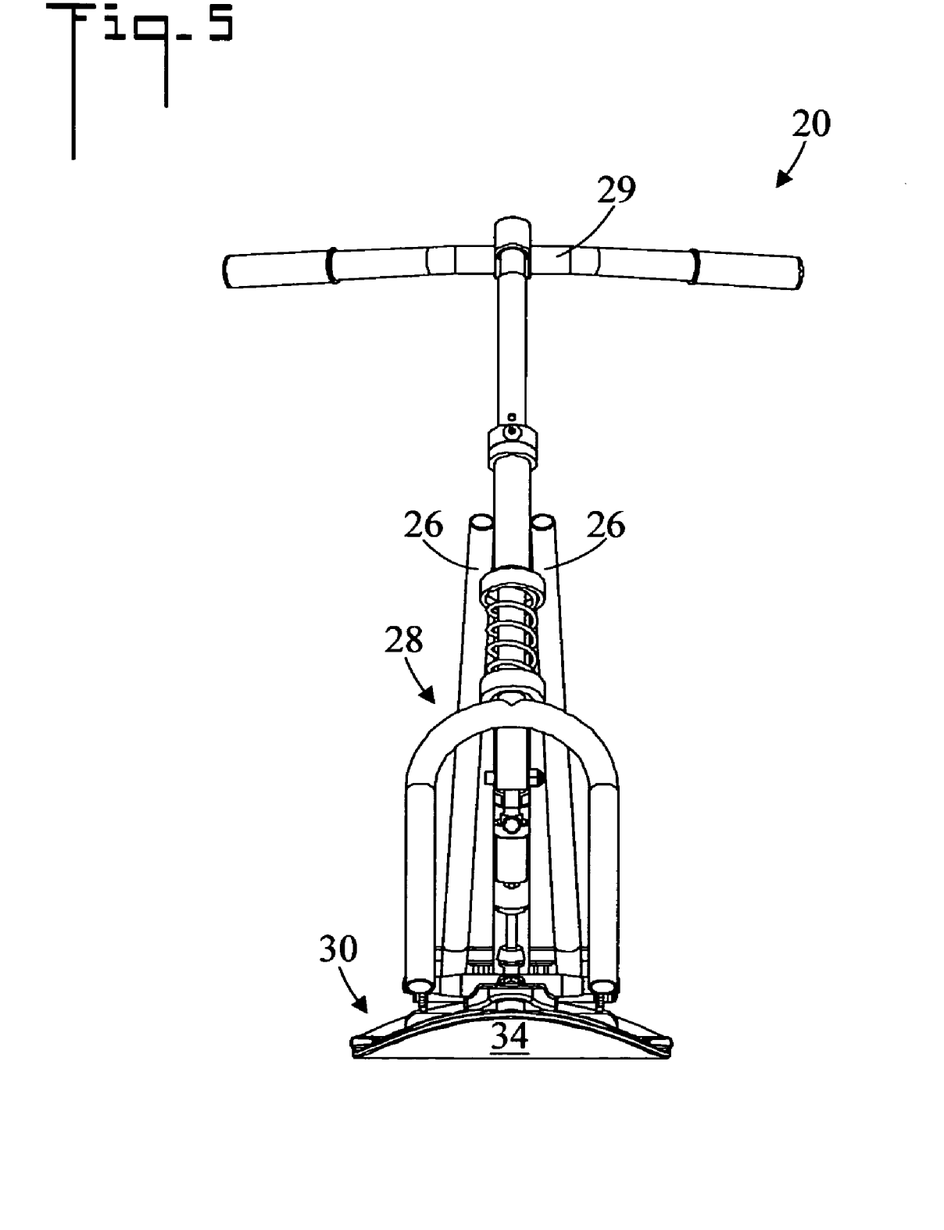
FIG. 5 is a front elevation view of the vehicle.
Figure 6:
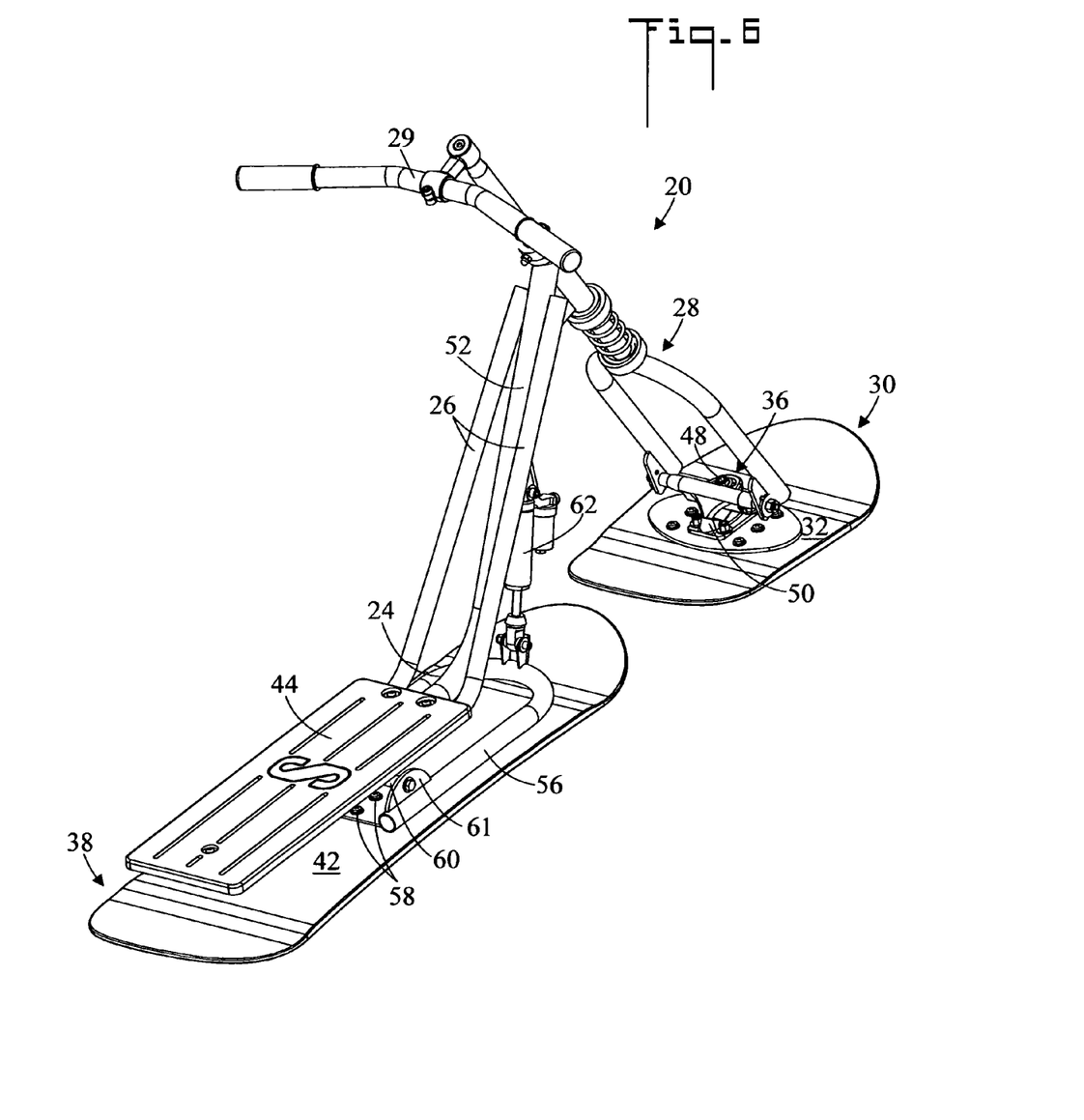
FIG. 6 is an opposite rear perspective view of the vehicle.

Referring now to FIG. 4, when front board 30 and rear board 38 are longitudinally aligned (in the as shown straight ahead position), in a plan view (bottom or top) (1) first board 30, (2) rear board 38, and (3) imaginary side lines 64 connecting front board 30 and rear board 38, all combining to substantially form an outline of a snowboard. That is, the perimeter of front board 30, rear board 38, and the connecting lines 64 define an outline of a conventional snowboard wherein the ends are rounded and the sides slightly concave. Stated another way, the width of the rear portion of front board 30 is approximately equal to the width of the front portion of rear board 38. As such, the vehicle of the present invention has dynamic motion properties which are similar to that of a snowboard or ski. Skis, snowboards, and mono skis are built with a side cut radius which allows the rider to carve a turn with a transfer of weight to the inside or outside of the ski do to this side cut radius/arc. Similarly the vehicle of the present invention forms one continues arc allowing the rider to turn to left or right with a transfer of weight to either side of the boards giving it the performance and feel of a single board at high speeds.

Referring now to FIGS. 7-9, there are illustrated an enlarged opposite rear perspective view of a front board 30 showing a biasing member, an enlarged top plan view showing the biasing member, and an enlarged side elevation view of the front board 30 showing the biasing member. Front board 30 has a nose 46, and the biasing member engages fork assembly 28 and front board 30, so that biasing member urges front board 30 into a nose up angle (refer to FIG. 9). In an embodiment of the invention, the nose 46 up angle A is between about 5° and 10°. This nose up feature, ensures that the nose of front board 30 will not penetrate and be captured by oncoming snow 500 (refer to FIG. 9).

In the shown embodiment, the biasing member is a torsion spring 70. Skateboard truck 36 has a first axle 72 and an opposite second axle 74. Fork assembly 28 has a first fork member 76 and an opposite second fork member 78, wherein first fork member 76 pivotally engages first axle 72 and second fork member 78 pivotally engages second axle 74. Torsion spring 70 has a first coil 80 which receives first axle 72, a second coil 82 which receives second axle 74, and a V-shaped arm disposed between first coil 80 and second coil 82 which engages skateboard truck 36. That is, the arm of torsion spring 70 presses upon the body of skateboard truck 36 and causes the truck, and therefore the entire front board 30, to rotate to a nose up position. Retaining pins 81 of first fork member 76 and second fork member 78 engage the ends of torsion spring 70, prevent the ends from rotating, and thereby result in the biasing action.

Figure 10:
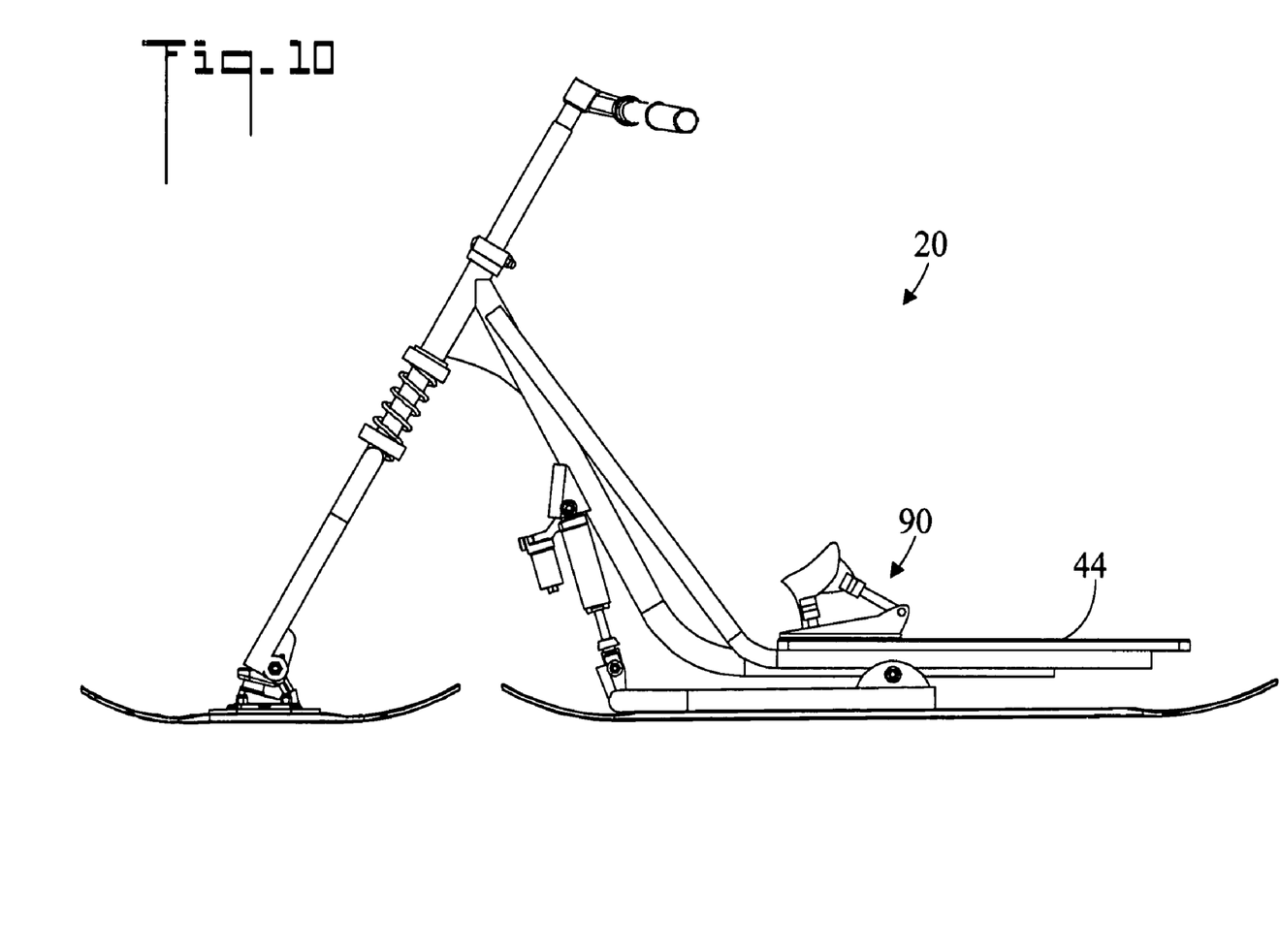

FIG. 10 is a side elevation view of a binding 90 attached to deck 44 of vehicle 20. Binding 90 receives and holds one foot of the rider in a fashion similar to the binding of a ski or snowboard.

Figure 11:
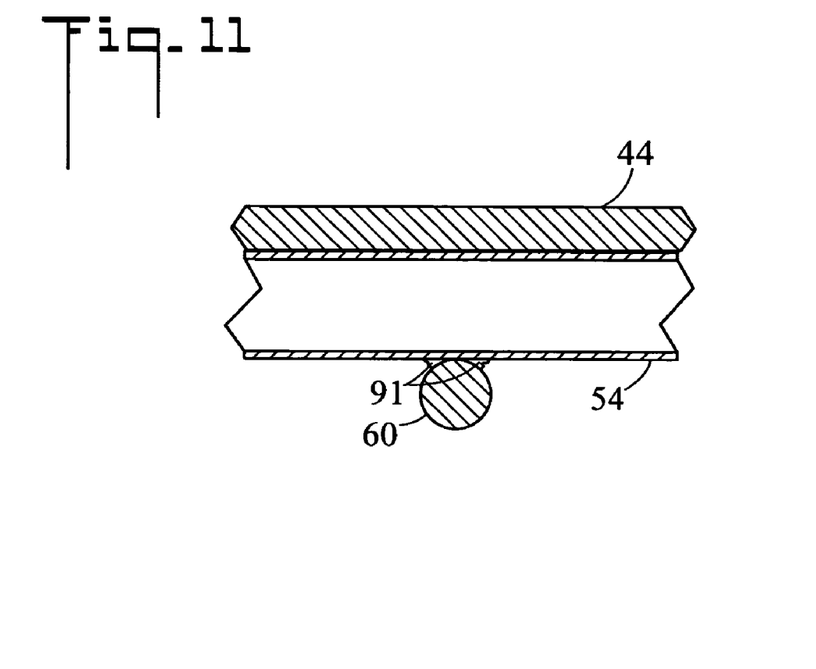
FIG. 11 is an enlarged cross sectional view along line 11-11 of FIG. 2; and, FIG. 12 is an enlarged cross sectional view along line 12-12 of FIG. 2.

FIG. 11 is an enlarged cross sectional view along line 11-11 of FIG. 2 showing the connection (by welding at 91) of lower portion 54 of frame 24 to pivot axle 60. Deck 44 is also shown resting upon lower portion 54.

Figure 12:
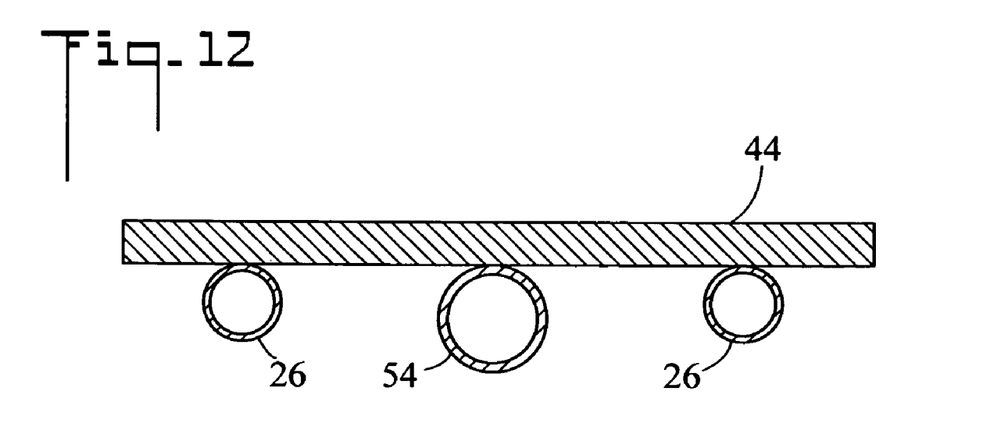

FIG. 12 is an enlarged cross sectional view along line 12-12 of FIG. 2, showing the connection of deck 44 to lower portion 54 of frame 24 and to angled side members 26. Deck 44 rests upon lower portion 54 of frame 24 and side members 26, and is connected by screws 45 or other means (refer to FIG. 2). In this fashion, deck 44 is firmly supported by frame 24 and angled side members 26.

The preferred embodiments of the invention described herein are exemplary and numerous modifications and rearrangements can be readily envisioned to achieve an equivalent result, all of which are intended to be embraced within the scope of the appended claims.

We claim:
1. A vehicle for use on snow or other surfaces, comprising:
a frame;
a fork assembly pivotally connected to said frame;
a front board having a top surface and an opposite bottom surface;
a skateboard truck connected to said top surface of said front board;
said fork assembly pivotally connected to said skateboard truck;
a rear board connected to said frame, said rear board having a top surface and an opposite bottom surface;
said frame having an upwardly angled upper portion and a horizontal lower portion;

a U-shaped stay mount connected to said top surface of said rear board;

said horizontal lower portion of said frame pivotally connected to said stay mount; and, a shock absorber connected between said stay mount and said upwardly angled upper portion of said frame.

2. A vehicle for use on snow or other surfaces, comprising:

a frame;

a fork assembly pivotally connected to said frame;

a front board having a top surface and an opposite bottom surface;

a skateboard truck connected to said top surface of said front board;

said fork assembly pivotally connected to said skateboard truck;

a rear board connected to said frame, said rear board having a top surface and an opposite bottom surface;

said front board having a nose;

said skateboard truck having a kingpin and a pivot cup;

said kingpin disposed between said nose and said pivot cup;

a biasing member engaging said fork assembly and said front board, said biasing member urging said front board into a nose up angle;

said nose up angle being between about 5° and about 10°;

said skateboard truck having a first axle and an opposite second axle;

said fork assembly having a first fork member and an opposite second fork member, wherein said first fork member pivotally engages said first axle and said second fork member pivotally engages said second axle;

said biasing member including a torsion spring having a first coil which receives said first axle, a second coil which receives said second axle, and an arm disposed between said first coil and said second coil which engages said skateboard truck;

said frame having an upwardly angled upper portion and a horizontal lower portion;

a U-shaped stay mount connected to said top surface of said rear board said horizontal lower portion of said frame pivotally connected to said stay mount;

a shock absorber connected between said stay mount and said upwardly angled upper portion of said frame;

when said front board and said rear board are longitudinally aligned, in plan view (1) said first board, (2) said rear board, and (3) imaginary side lines connecting said front board and said rear board, all combining to substantially form an outline of a snowboard;

two angled side members connected to said frame; and, a deck connected to said frame and said two angled side members.

3. A vehicle for use on snow or other surfaces, comprising:

a frame;

a fork assembly pivotally connected to said frame;

a front board having a top surface, an opposite bottom surface, and a nose;

said front board pivotally connected to said fork assembly;

a biasing member engaging said fork assembly and said front board, said biasing member urging said front board into a nose up angle;

a rear board connected to said frame, said rear board having a top surface and an opposite bottom surface;

said frame having an upwardly angled upper portion and a horizontal lower portion;

a U-shaped stay mount connected to said top surface of said rear board;

said horizontal lower portion of said frame pivotally connected to said stay mount; and, a shock absorber connected between said stay mount and said upwardly angled upper portion of said frame.

4. A vehicle for use on the snow or other surfaces, comprising:

a frame;

a fork assembly pivotally connected to said frame;

a front board having a top surface and an opposite bottom surface;

a fork assembly pivotally connected to a skateboard truck; and, said frame having an upwardly angled upper portion and a horizontal lower portion;

a U-shaped stay mount connected to a top surface of a rear board;

said horizontal lower portion of said frame pivotally connected to said stay mount;

a shock absorber connected between said stay mount and said upwardly angled upper portion of said frame; and, said rear board connected to said frame, said rear board having a top surface and an opposite bottom surface.

5. The vehicle according to claim 4, further including:

when said front board and said rear board are longitudinally aligned, in plan view (1) said first board, (2) said rear board, and (3) imaginary side lines connecting said front board and said rear board, all combining to substantially form an outline of a snowboard.

6. The vehicle according to claim 4, further including:

two angled side members connected to said frame; and, a deck connected to said frame and said two angled side members.

* * * * *